United States Patent
Fujimoto

(10) Patent No.: US 10,476,107 B2
(45) Date of Patent: Nov. 12, 2019

(54) BATTERY

(71) Applicant: Panasonic Intellectual Property Management Co., Ltd., Osaka (JP)

(72) Inventor: Masahisa Fujimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/634,059

(22) Filed: Jun. 27, 2017

(65) Prior Publication Data

US 2018/0034104 A1 Feb. 1, 2018

(30) Foreign Application Priority Data

Jul. 28, 2016 (JP) .................. 2016/148139

(51) Int. Cl.
| | |
|---|---|
| *H01M 10/056* | (2010.01) |
| *H01M 10/0567* | (2010.01) |
| *H01M 4/587* | (2010.01) |
| *H01M 10/0525* | (2010.01) |

(52) U.S. Cl.
CPC ....... *H01M 10/0567* (2013.01); *H01M 4/587* (2013.01); *H01M 10/0525* (2013.01); *H01M 2300/0025* (2013.01)

(58) Field of Classification Search
CPC .................................. H01M 10/0567
USPC ................................................ 429/188
See application file for complete search history.

(56) References Cited

U.S. PATENT DOCUMENTS

| | | | | |
|---|---|---|---|---|
| 2004/0091772 | A1* | 5/2004 | Ravdel | H01M 10/0525 429/188 |
| 2013/0004859 | A1* | 1/2013 | Yu | H01M 10/052 429/331 |
| 2016/0164101 | A1* | 6/2016 | Nagano | H01M 4/131 429/144 |

FOREIGN PATENT DOCUMENTS

JP     7-065855     3/1995

* cited by examiner

*Primary Examiner* — Bryan D. Ripa
*Assistant Examiner* — James M Erwin
(74) *Attorney, Agent, or Firm* — McDermott Will & Emery LLP

(57) ABSTRACT

A battery includes a positive electrode, a negative electrode containing graphite, and an electrolyte solution containing 2,2'-bipyridyl. The molar ratio of 2,2'-bipyridyl in the electrolyte solution to the graphite is $4.091 \times 10^{-6}$ or less.

7 Claims, 1 Drawing Sheet

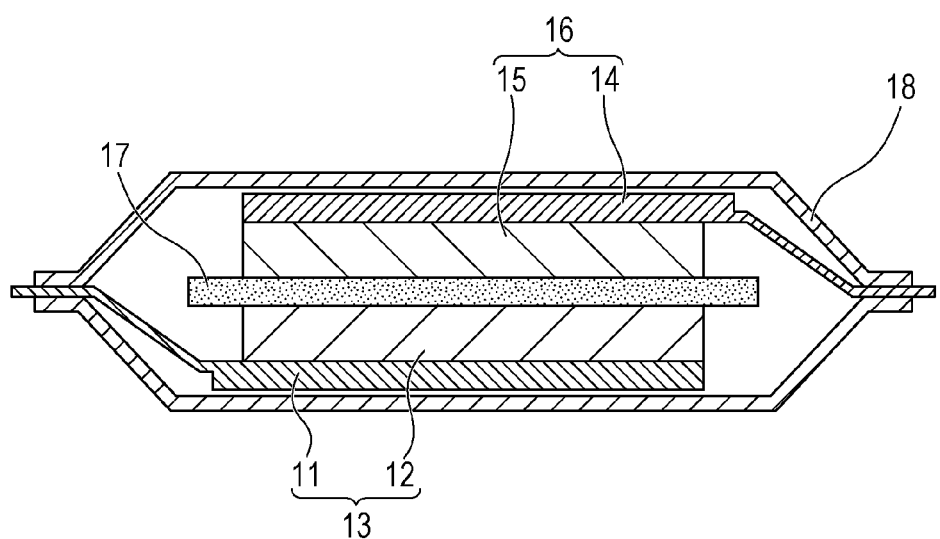

BATTERY

BACKGROUND

1. Technical Field

The present disclosure relates to a battery.

2. Description of the Related Art

Japanese Patent No. 3292220 discloses a lithium battery including a substance that includes at least one selected from a nitrogen atom, a phosphorus atom, and a sulfur atom each having a lone pair and that includes a pyridine ring.

SUMMARY

In the related art, there is a need to improve the initial charge-discharge efficiency of graphite.

In one general aspect, the techniques disclosed here feature a battery including a positive electrode, a negative electrode containing graphite, and an electrolyte solution containing 2,2'-bipyridyl. The molar ratio of 2,2'-bipyridyl in the electrolyte solution to the graphite is $4.091 \times 10^{-6}$ or less.

According to the present disclosure, the initial charge-discharge efficiency of graphite can be improved.

Additional benefits and advantages of the disclosed embodiments will become apparent from the specification and drawing. The benefits and/or advantages may be individually obtained by the various embodiments and features of the specification and drawing, which need not all be provided in order to obtain one or more of such benefits and/or advantages.

BRIEF DESCRIPTION OF THE DRAWING

FIGURE is a schematic sectional view of an example battery in a first embodiment.

DETAILED DESCRIPTION

An embodiment of the present disclosure will be described below with reference to the drawing.

First Embodiment

A battery according to a first embodiment includes a positive electrode, a negative electrode, and an electrolyte solution.

The negative electrode contains graphite.

The electrolyte solution contains a compound that causes a cathodic reduction reaction.

The configuration described above improves the initial charge-discharge efficiency of graphite. For example, the initial charge-discharge efficiency of graphite can be increased similarly to the initial charge-discharge efficiency of the positive electrode. This realizes, for example, an improvement in battery capacity.

The initial charge-discharge efficiency of graphite may not be 100%. This is because the electrolyte solution decomposes at graphite active sites and a certain amount of electricity is consumed to form a film of the decomposition product on the graphite. In the present disclosure, the compound that causes a cathodic reduction reaction and is contained in the electrolyte solution inactivates graphite active sites. This reduces the amount of electricity consumed to inactivate graphite active sites. Therefore, the initial charge-discharge efficiency of graphite can be improved. In addition, the need for an additional production process for inactivating a graphite electrode can be eliminated. Consequently, simple production facilities and low production costs are realized.

The compound that causes a cathodic reduction reaction and is contained in the electrolyte solution refers to a substance that causes the reduction reaction at graphite active sites during initial charging.

More specifically, the compound that causes a cathodic reduction reaction and is contained in the electrolyte solution is at least one compound selected from the group consisting of 2,2'-bipyridyl, phenanthroline, pyrazine, pyrimidine, quinoxaline, quinoline, and the like. These compounds have a property of forming an n-type conductive polymer.

At the negative electrode, graphite is reduced during initial charging, and Li is intercalated electrochemically. At a higher potential before intercalation, the reduction radical reaction of the compound that causes a cathodic reduction reaction occurs at graphite active sites. As a result, the graphite active sites are covered with a reaction product.

At the graphite active sites, a radical of the compound is generated by the electrochemical reduction of the compound. Once a radical is generated, the radical moves to the reaction product and subsequent radical reactions occur one after another. Therefore, the amount of the reaction product is much larger than the amount of electricity consumed for electrochemical reduction. If there is no reactant near reaction products to which radicals have moved, there is a high possibility that the radicals react with each other to end the reaction. Therefore, the amount of the reaction product is largely affected by the concentration of the reactant.

An electrolyte solution known in the art that is free of the compound that causes a cathodic reduction reaction decomposes at graphite active sites. The reaction product generated by the decomposition forms a coating film. A certain amount of electricity is thus consumed to cover graphite active sites with the reaction product. Therefore, the ratio of the amount of the reaction product to the amount of electricity is 1:1. When an additive known in the art (a substance that does not cause a cathodic reduction reaction) is added to the electrolyte solution, the ratio of the amount of the reaction product to the amount of electricity consumed by the reaction is also 1:1. Similarly to an additive-free electrolyte solution, an additive known in the art does not contribute to an improvement in initial charge-discharge efficiency.

The present disclosure is characterized by being based on a radical reaction. The ratio of the amount of the reaction product to the amount of electricity is not 1:1, and the amount of the reaction product exceeds the amount of electricity. In other words, a large amount of the reaction product can be produced with a small amount of electricity on the basis of the radical reaction. This enables graphite active sites to be covered with the reaction product with a small amount of electricity. As a result, the amount of electricity consumed by inactivation of graphite active sites can be reduced. Therefore, the initial charge-discharge efficiency of graphite can be improved.

The compound (compound that causes a cathodic reduction reaction) in an amount sufficient to inactivate the graphite active sites through the cathodic reduction reaction is added to the electrolyte solution.

In the battery according to the first embodiment, the compound that causes a cathodic reduction reaction and is contained in the electrolyte solution may be 2,2'-bipyridyl.

At this case, the molar ratio of 2,2'-bipyridyl in the electrolyte solution to graphite may be $4.091 \times 10^{-6}$ or less.

The configuration described above eliminates or reduces coverage of sites other than active sites of graphite with 2,2'-bipyridyl. This suppresses a decrease in discharge capacity.

The battery according to the first embodiment may be constructed as a secondary battery.

FIGURE is a schematic sectional view of an example battery in the first embodiment.

The battery illustrated in FIGURE includes a positive electrode 13, a negative electrode 16, a separator 17, and a case 18.

The positive electrode 13 includes a positive electrode current collector 11 and a positive electrode mixture layer 12 formed on the positive electrode current collector 11.

The negative electrode 16 includes a negative electrode current collector 14 and a negative electrode mixture layer 15 formed on the negative electrode current collector 14.

The positive electrode 13 and the negative electrode 16 oppose each other across the separator 17.

The positive electrode 13, the negative electrode 16, and the separator 17 are covered with the case 18 to from a battery.

The positive electrode mixture layer 12 may contain a positive electrode active material that can intercalate and deintercalate lithium ions.

As the positive electrode active material, a known material that can intercalate and deintercalate lithium ions may be used. Specifically, for example, a transition metal oxide or a lithium-containing transition metal oxide may be used as the positive electrode active material. Specifically, for example, a cobalt oxide, a nickel oxide, a manganese oxide, a vanadium oxide such as vanadium pentoxide ($V_2O_5$), a mixture thereof, or a compound oxide thereof may be used as the positive electrode active material. A compound oxide containing lithium and a transition metal, such as lithium cobalt oxide ($LiCoO_2$), may be used as the positive electrode active material. For example, a transition metal silicate or a transition metal phosphate, such as lithium iron phosphate ($LiFePO_4$), may be used as the positive electrode active material.

As the positive electrode current collector 11, a porous or non-porous sheet or film made of a metal material, such as aluminum, stainless steel, titanium, or an alloy thereof, may be used. As the sheet or film, for example, a metal foil or a mesh may be used.

The negative electrode mixture layer 15 contains graphite as a negative electrode active material.

In the first embodiment, the composition of graphite that has intercalated lithium (i.e., a graphite intercalation compound produced during charging) may be at least one selected from $C_6Li$, $C_{12}Li$, $C_{18}Li$, and $C_{24}Li$.

As the negative electrode current collector 14, a porous or non-porous sheet or film made of a metal material, such as aluminum, stainless steel, nickel, copper, or an alloy thereof, may be used. As the sheet or film, for example, a metal foil or a mesh may be used.

At least one of the positive electrode mixture layer 12 and the negative electrode mixture layer 15 may contain a conductive assistant, an ion conductor, a binder, and the like.

The conductive assistant may be used to reduce the electrode resistance. Examples of the conductive assistant to be used include carbon materials, such as carbon black, graphite, and acetylene black; and conductive polymers, such as polyaniline, polypyrrole, and polythiophene.

The ion conductor may be used to reduce the electrode resistance. Examples of the ion conductor to be used include gel electrolytes, such as polymethyl methacrylate; and solid electrolytes, such as polyethylene oxide.

The binder may be used to improve the bonding strength between materials contained in the electrode. Specific examples of the binder to be used include polyvinylidene fluoride, vinylidene fluoride-hexafluoropropylene copolymer, vinylidene fluoride-tetrafluoroethylene copolymer, polytetrafluoroethylene, carboxymethyl cellulose, polyacrylic acid, styrene-butadiene copolymer rubber, polypropylene, polyethylene, and polyimide.

As the separator 17, a porous membrane made of polyethylene, polypropylene, glass, cellulose, ceramics, or the like may be used. The porous membrane may be used while the pores in the porous membrane are filled with the electrolyte.

The separator 17 may be impregnated with the electrolyte solution.

The electrolyte solution contains, for example, a non-aqueous solvent and a lithium salt dissolved in the non-aqueous solvent.

Examples of the non-aqueous solvent to be used include cyclic carbonate solvents, chain carbonate solvents, cyclic ether solvents, chain ether solvents, cyclic ester solvents, and chain ester solvents.

Examples of cyclic carbonate solvents include ethylene carbonate, propylene carbonate, and butylene carbonate.

Examples of chain carbonate solvents include dimethyl carbonate, ethyl methyl carbonate, and diethyl carbonate.

Examples of cyclic ether solvents include tetrahydrofuran, 1,4-dioxane, and 1,3-dioxolane.

Examples of chain ether solvents include 1,2-dimethoxyethane and 1,2-diethoxyethane.

Examples of cyclic ester solvents include γ-butyrolactone.

Examples of chain ester solvents include methyl acetate.

One non-aqueous solvent selected from these solvents may be used alone as the non-aqueous solvent. Alternatively, two or more non-aqueous solvents selected from these solvents may be used in combination as the non-aqueous solvent.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these lithium salts may be used alone as the lithium salt. Alternatively, a mixture of two or more lithium salts selected from these lithium salts may be used as the lithium salt.

The case 18 may be, for example, a case member such as of a generally known laminate type.

The battery in the first embodiment may have various shapes, such as a coin shape, a cylindrical shape, a prismatic shape, a sheet shape, a button shape, a flat shape, and a stacked shape.

EXAMPLES

Example 1

Graphite (MAG available from Hitachi Chemical Co., Ltd.) was applied to a copper foil by using styrene-butadiene rubber (SBR) as a binding agent. The resulting product was dried and punched out in the form of 2×2 cm and used as a negative electrode.

A piece of lithium metal was used as a counter electrode.

A 1 M solution of $LiPF_6$ containing 2,2'-bipyridyl in a mixture of ethylene carbonate (EC) and methyl ethyl carbonate (MEC) (EC:MEC=1:3 by volume ratio) was used in an amount of 0.5 cc as an electrolyte solution.

A microporous separator was used as a separator. The separator was impregnated with the electrolyte solution.

The components described above were assembled into a test cell of Example 1 of a laminate case type.

Examples 2 to 7

The amount of 2,2'-bipyridyl added to the electrolyte solution was changed.

Except for this, test cells of Examples 2 to 7 were each assembled in the same manner as that in Example 1 described above.

Comparative Example 1

The electrolyte solution was free of 2,2'-bipyridyl.

Except for this, a test cell of Comparative Example 1 was assembled in the same manner as that in Example 1 described above.

Charge-Discharge Test

Charging and discharging were carried out at a constant current of 2 mA by using the test cells of Examples 1 to 7 and Comparative Example 1.

Table 1 shows the weight of graphite used in Examples 1 to 7 and Comparative Example 1, the concentration of 2,2'-bipyridyl in the electrolyte solution, the molar ratio of 2,2'-bipyridyl in the electrolyte solution to graphite (the molar ratio of 2,2'-bipyridyl/graphite), the results of the charge-discharge test (initial charge capacity, initial discharge capacity, initial charge-discharge efficiency), and the like.

involved in the reaction causes the reaction product to further cover sites other than active sites of graphite. This reduces discharge capacity.

In particular, in Example 7 (where the molar ratio of 2,2'-bipyridyl/graphite is 0.324324), the charge reaction mostly involves the reduction reaction of 2,2'-bipyridyl. Therefore, the spaces between layers of graphite are completely filled with the reaction product. As a result, it is impossible to perform discharging.

In Example 1 (where the molar ratio of 2,2'-bipyridyl/graphite is $4.091 \times 10^{-6}$), a minimum amount of electricity is used for radical reactions, and radical reduction reactions proceed successively. At this time, the absolute amount of 2,2'-bipyridyl is small, and 2,2'-bipyridyl is present only in an amount sufficient to cover graphite active sites. Therefore, the coverage of active sites is accomplished with a minimum amount of electricity. As a result, about 96.3% of the amount of electricity for charging can be used for intercalation of lithium into graphite, which is an intended charging reaction. This improves the initial charge-discharge efficiency.

The battery of the present disclosure may be used as, for example, a lithium secondary battery.

What is claimed is:

1. A battery comprising:
   a positive electrode;
   a negative electrode containing graphite; and
   an electrolyte solution containing 2,2'-bipyridyl,
   wherein a molar ratio $M_1/M_2$ is less than $4.02 \times 10^{-5}$,
   where $M_1$ is a molar amount of the 2,2'-bipyridyl contained in the electrolyte solution and $M_2$ is a molar amount of the graphite contained in the negative electrode.

TABLE 1

|  | Comparative Example 1 | Example 1 | Example 2 | Example 3 | Example 4 | Example 5 | Example 6 | Example 7 |
|---|---|---|---|---|---|---|---|---|
| concentration of 2,2'-bipyridyl (M) | 0 | 0.0000125 | 0.000125 | 0.00125 | 0.0125 | 0.25 | 0.5 | 1 |
| injection volume (cc) | 0.5 | 0.5 | 0.5 | 0.5 | 0.5 | 0.5 | 0.5 | 0.5 |
| absolute amount of 2,2'-bipyridyl (μmol) | 0 | 0.00625 | 0.0625 | 0.625 | 6.25 | 125 | 250 | 500 |
| weight of graphite | 0.111 | 0.11 | 0.112 | 0.111 | 0.112 | 0.111 | 0.113 | 0.111 |
| number of moles of graphite (mol) | 0.001542 | 0.0015278 | 0.001556 | 0.001542 | 0.001556 | 0.001542 | 0.001569 | 0.001542 |
| molar ratio of 2,2'-bipyridyl/graphite | 0 | $4091 \times 10^{-6}$ | $4.02 \times 10^{-5}$ | 0.000405 | 0.004018 | 0.081081 | 0.159292 | 0.324324 |
| charge capacity density (mAh/g) | 345 | 347 | 335 | 234 | 287 | 225 | 59 | 34 |
| discharge capacity density (mAh/g) | 327 | 334 | 314 | 216 | 265 | 192 | 28 | 0 |
| initial efficiency | 0.947826 | 0.962536 | 0.937313 | 0.923077 | 0.923345 | 0.853333 | 0.474576 | 0 |
| initial irreversible capacity (mAh/g) | 18 | 13 | 21 | 18 | 22 | 33 | 31 | 34 |
| x in (C6Li)Px | 0.055046 | 0.0397554 | 0.06422 | 0.055046 | 0.067278 | 0.100917 | 0.094801 | 0.103976 |

Discussion

The comparison between Example 1 and Comparative Example 1 indicates that the initial charge-discharge efficiency of Example 1 (where the molar ratio of 2,2'-bipyridyl/graphite is $4.091 \times 10^{-6}$) is about 96.3%, which is higher than the initial charge-discharge efficiency (about 94.8%) of Comparative Example 1 (where 2,2'-bipyridyl is not added (the molar ratio of 2,2'-bipyridyl/graphite=0)).

The comparison between Example 1 and Examples 2 to 7 indicates that an excessively high molar ratio of 2,2'-bipyridyl/graphite results in a low discharge capacity. In other words, an excessively large amount of 2,2'-bipyridyl 2. The battery according to claim 1, wherein the graphite is in contact with the electrolyte solution.

3. The battery according to claim 1, wherein the negative electrode contains the graphite as an active material.

4. The battery according to claim 3, wherein the negative electrode includes a negative electrode mixture layer containing the graphite and at least one of a conductive assistant, an ion conductor, and a binder.

5. The battery according to claim 4, further comprising a separator impregnated with the electrolyte solution, wherein the separator is placed between the positive electrode and the negative electrode, and the separator is in contact with the negative electrode mixture layer.

6. The battery according to claim 4, wherein the negative electrode includes a negative electrode current collector, and the negative electrode mixture layer is formed on the negative electrode current collector.

7. The battery according to claim 1, wherein the molar ratio $M_1/M_2$ is $4.091 \times 10^{-6}$ or less.

* * * * *